(12) United States Patent
Glaeser

(10) Patent No.: US 6,706,220 B1
(45) Date of Patent: Mar. 16, 2004

(54) MIXTURE CONSISTING OF METAL PARTICLES AND/OR ALLOY PARTICLES AND OF A LIQUID ELECTROLYTIC MEDIUM AND METHOD FOR PRODUCING THE SAME

(75) Inventor: Wolfgang Glaeser, Goslar (DE)

(73) Assignee: Grillo-Werke AG, Duisburg (DE)

( * ) Notice: Subject to any disclaimer, the term of this patent is extended or adjusted under 35 U.S.C. 154(b) by 0 days.

(21) Appl. No.: 09/926,833

(22) PCT Filed: Apr. 27, 2000

(86) PCT No.: PCT/EP00/03798

§ 371 (c)(1),
(2), (4) Date: Mar. 11, 2002

(87) PCT Pub. No.: WO01/03209

PCT Pub. Date: Jan. 11, 2001

(30) Foreign Application Priority Data

Jun. 30, 1999 (DE) .......................................... 199 30 214

(51) Int. Cl.[7] .......................... H01M 4/02; H01M 4/42; B22F 9/02
(52) U.S. Cl. ................. 252/512; 252/182.1; 252/519.5; 252/500; 423/99; 423/622; 420/513; 429/229; 429/218.1
(58) Field of Search ........................... 252/182.1, 519.5, 252/518.1, 62.2, 500, 503, 512; 423/99, 622; 420/513; 75/331, 339; 429/229, 231, 206, 212, 218.1

(56) References Cited

U.S. PATENT DOCUMENTS 4,386,019 A * 5/1983 Kaun et al. .................. 252/503
4,606,869 A * 8/1986 Showak ........................ 75/339

FOREIGN PATENT DOCUMENTS

| DE | 3238240 A1 | 10/1982 | ............ B22F/9/08 |
| EP | 59139558 | 8/1984 | ............ H01M/4/12 |
| EP | 07161356 | 6/1995 | ............ H01M/4/42 |
| JP | 59-139558 | * 8/1984 | ............ H01M/6/08 |
| JP | 04-284357 | * 8/1992 | ............ H01M/4/42 |
| JP | 07-161356 | * 6/1995 | ............ H01M/4/42 |
| JP | 10-032002 | * 2/1998 | ............ H01M/4/42 |
| WO | WO 98/50969 | * 11/1998 | ............ H01M/4/42 |
| WO | PCT/EP00/03798 | 11/2000 | ............ B22F/9/06 |

OTHER PUBLICATIONS

PZM Data Sheet, "Zinc Alloys, Properties", no date.*

* cited by examiner

Primary Examiner—Yogendra N. Gupta
Assistant Examiner—Kallambella Vijayakumar
(74) Attorney, Agent, or Firm—Jacobson Holman PLLC

(57) ABSTRACT

In the mixture of metal and/or alloy particles and a liquid electrolytic medium, the metal and/or alloy particles are irregularly shaped, have a non-uniform surface and a bulk density of below 33% by weight of the specific density of the compact metal and/or the compact alloy, and the volume of the medium is larger than that which corresponds to the spaces between the particles in a dry packing.

15 Claims, 4 Drawing Sheets

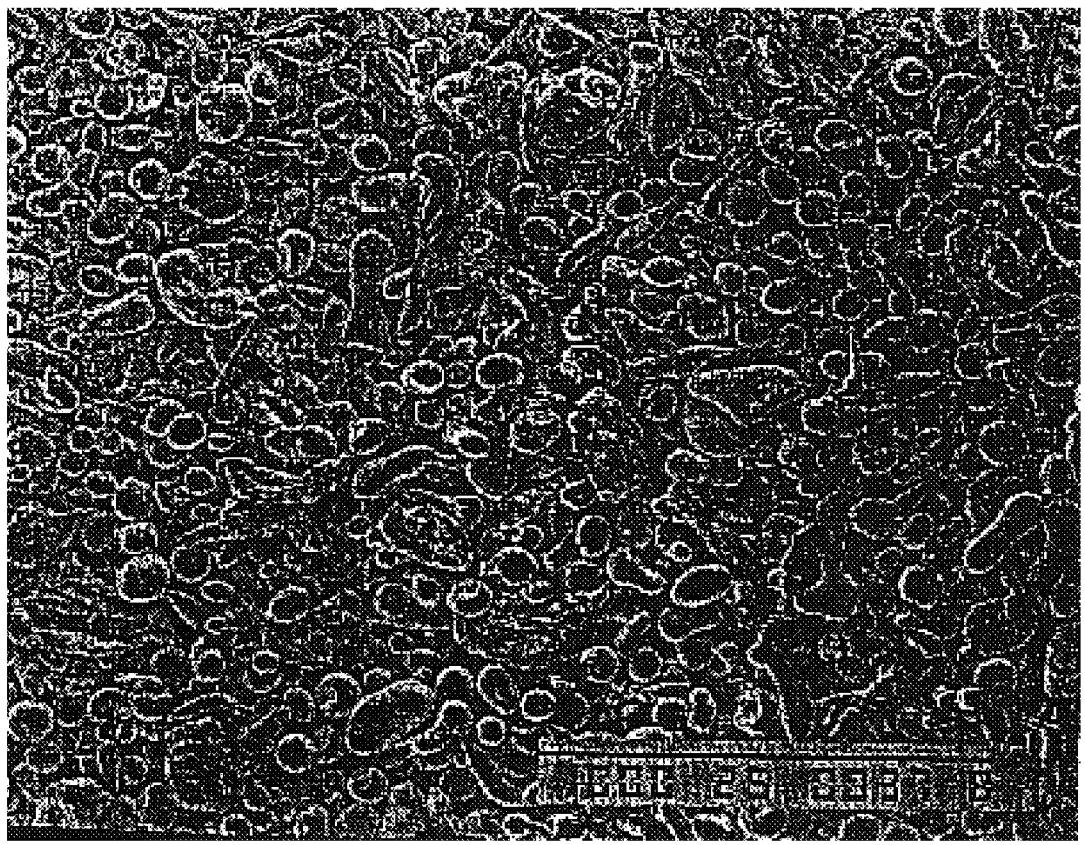
Figur 1

Figur 2

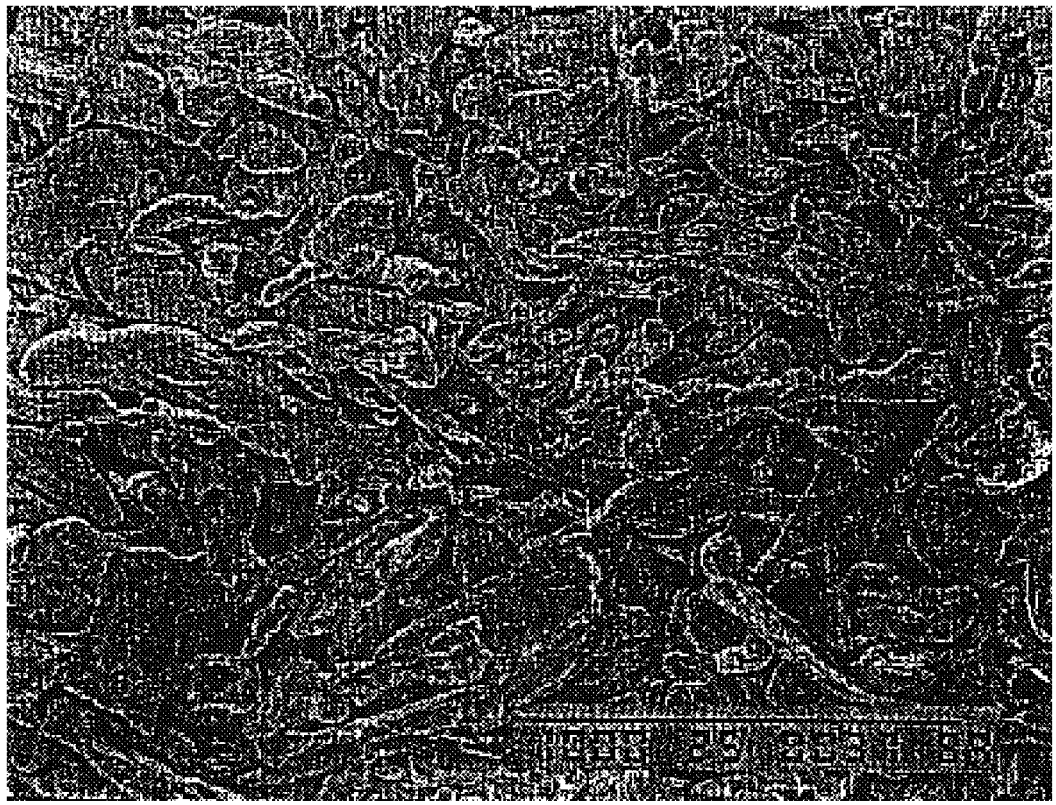
Figur 3

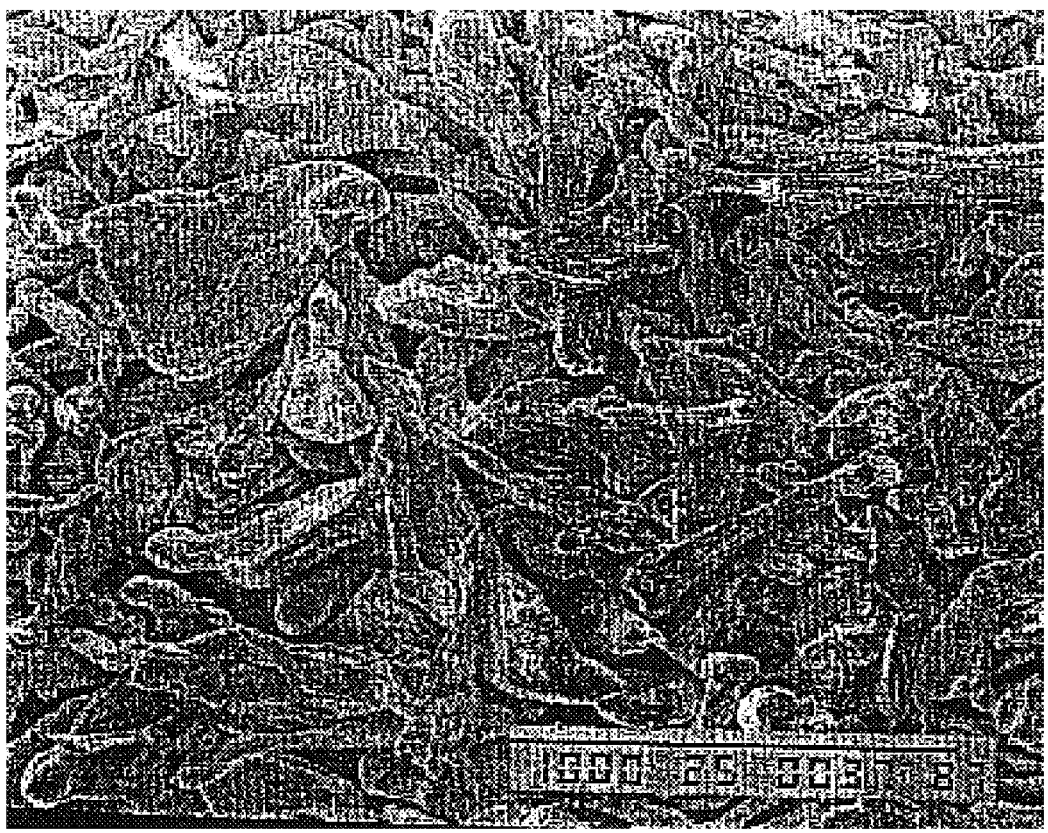
Figur 4

MIXTURE CONSISTING OF METAL PARTICLES AND/OR ALLOY PARTICLES AND OF A LIQUID ELECTROLYTIC MEDIUM AND METHOD FOR PRODUCING THE SAME

This is a 371 of PCT/EP00/03798 filed Apr. 27, 2000, disclosure of which is incorporated herein by reference.

The present invention relates to a mixture of metal and/or alloy particles and a liquid electrolytic medium, and a process for the preparation thereof.

Such mixtures are known and are used for different purposes, those mixtures being particularly important in which the metal and/or alloy particles can dissolve in the liquid electrolytic medium and thereby release electric current. Thus, in particular, these are mixtures of metal or alloy particles in which the particles can dissolve in an acid or lye. Such chemical reactions are extensively used for the production of electric current, for example, in batteries and accumulators, i.e., rechargeable batteries.

A very frequently employed mixture consists of zinc particles or particles of a zinc alloy and solutions of alkali as the liquid electrolytic medium. These mixtures are employed, for example, together with mixtures of manganese dioxide with components of a liquid electrolytic medium, the two mixtures mostly being separated by a separator. The particles of zinc or zinc alloys are prepared from liquid zinc or liquid zinc alloys according to various known methods, for example, by atomization or granulation. Depending on the process conditions, the grain sizes, the grain size distribution and the outer shapes of the particles can be adjusted, sieve fractions often being separated from the oversize and undersize.

From WO 98/50969, it is known to employ particles of zinc or zinc alloys which have not been admixed with mercury, however, for electrochemical cells, wherein the zinc particles are to be shaped as uniformly as possible. It is considered disadvantageous that the zinc particles previously employed in such electrochemical cells are irregularly shaped, which results in a worse electric contact between the zinc particles. In order to reduce this drawback, attempts have been made in the past to increase the concentration of the zinc particles in the anode. However, this reduces the available space for the electrolyte and the reaction products.

On pages 1 and 2 of this document, both the previous state of the art and the previously employed methods for improving the quality are surveyed.

According to WO 98/50969, the quality is to be improved by using uniformly shaped zinc particles of equal sizes. Preferably employed are uniformly shaped platelets which are admixed with other zinc powders in more or less large amounts so that the tap density is reduced. By the addition of approximately 10% of such platelets, the zinc content can be reduced from 69–71% to 62–64%.

A disadvantage of such mixtures is the fact that it is relatively difficult in practice to prepare homogeneous mixtures of such platelets and other zinc powders which will not segregate during the preparation process and thereby result in an inhomogeneous tap density and thus inhomogeneous battery fillings.

It has been the object of the invention to provide mixtures of metal and/or alloy particles and a liquid electrolytic medium which can be prepared in an easily reproducible way, do not result in segregation and, when incorporated in batteries and accumulators, exhibit optimum properties in terms of performance, durability, resistance to heavy discharges and mechanical shocks while the release of gases is avoided.

This object has now been achieved by the metal and/or alloy particles being irregularly shaped, have a non-uniform surface and a bulk density of below 33% by weight of the specific density of the compact metal and/or the compact alloy, and the volume of the liquid medium is larger than that which corresponds to the spaces between the particles in a dry packing.

Such mixtures have optimum properties when the medium is solidified by a gelling agent. Preferably employed are mixtures in which the metal and/or alloy particles consists of zinc and/or a zinc alloy. These mixtures should preferably contain less than 65% by weight, more preferably even less than 62% by weight, of zinc and/or zinc alloy.

Metal and/or alloy particles which are suitable for the mixtures according to the invention, have a non-uniform surface and a bulk density of below 33% by weight of the specific density of the compact metal and/or the compact alloy can be prepared, for example, by a granulation method in which irregular zinc particles are formed. Irregular particles are formed, in particular, by the sudden release of dissolved gases, by the solidification of metal melts and by the formation of a porous cast. Such particles have a very broad grain size distribution, are irregularly shaped and have a non-uniform surface. Thus, the surface is relatively large per unit weight of the metal. Nevertheless, the particles are capable of providing much direct electric contact. The use of a gelling agent in the liquid electrolytic medium significantly reduces the sensitivity towards mechanical shocks.

When zinc and zinc alloys are used, a bulk density of below 33% by weight of the specific density of the compact metal and/or the compact alloy means a bulk density of about 2.3 g/ml. Using the above described irregular granules, it is possible to prepare bulk densities of even below 2.3 g/ml and thus to prepare battery fillings having a content of less than 62% by weight of zinc in the mixture. In alkaline zinc batteries with a separator and manganese dioxide, for example, such mixtures have excellent properties in terms of performance, durability, resistance to heavy discharges and mechanical shocks while the release of larger amounts of gases is avoided.

The bulk density of such metal and/or alloy particles is determined, for example, according to ASTM-B 212. Such mixtures still have sufficient direct contact between almost all particles, but also have enough spaces for the electrolytes and the reaction products when the current is generated.

Due to the excess of electrolyte, these mixtures can be easily dosed in the usual way. Thus, it is possible, while maintaining the previous preparation methods for batteries, to introduce mixtures which contain less zinc and more electrolyte, but exhibit advantages in terms of properties of the finished battery which are not exhibited by previous batteries. These properties are particularly advantageous for batteries which are supposed to constantly provide high powers while ensuring a minimum voltage of 0.9 V/cell. As the zinc alloy for this purpose, an alloy has proven particularly suitable which contains 250 ppm of bismuth, 800 ppm of indium, but less than 30 ppm of lead. Of course, other alloys and alloy ranges are also well suitable.

Thus, the present invention relates not only to the mixture of metal and/or alloy particles and a liquid electrolytic medium, but also to the process for preparing such a mixture, which is characterized in that the liquid metal or the liquid alloy is processed into particles by spraying or granulating which are irregularly shaped, have a non-uniform surface and a bulk density of below 33% by weight of the specific density of the compact metal and/or the compact alloy, and optionally after separating oversize and/or undersize, the particles are introduced into a liquid electrolyte which optionally contains a gelling agent or to which a gelling agent is added, the volume of the liquid electrolyte being larger than that which corresponds to the spaces between the metal or alloy particles in a dry packing.

Finally, the invention relates to the use of irregularly shaped metal and/or alloy particles which have a non-uniform surface and a bulk density of below 33% by weight of the specific density of the compact metal and/or the compact alloy, for the preparation of mixtures with a liquid electrolytic medium in which the volume of the medium is larger than that which corresponds to the spaces between the particles in a dry packing.

In the accompanying FIGS. 1 to 4, various zinc-based alloy particles are depicted at 50 times magnification.

FIG. 1 shows a previously usual product with predominantly roundish particles and a bulk density of 3.62 g/ml.

FIGS. 2 to 4 show irregular products of the same zinc alloy with bulk densities of 2.40 g/ml (FIG. 2), 2.00 g/ml (FIG. 3) and 1.85 g/ml (FIG. 4).

The products according to FIGS. 3 and 4 show optimum results when processed into a mixture with a liquid electrolytic medium which contains more liquid medium than the amount which corresponds to the spaces between the particles in a dry packing. Batteries made from such mixtures exhibit optimum results in terms of performance, durability, resistance to heavy discharges and mechanical shocks while the release of gases is avoided.

What is claimed is:

1. An electricity releasing mixture comprising:
    a) particles of a metal, metal alloy, or combination thereof, characterized in that the particles are irregularly shaped, have a non-uniform surface, and have a bulk density below 33% by weight of the specific density of the metal, metal alloy, or combination thereof, and
    b) an electrolytic medium, characterized in that the volume of the medium is larger than the void volume of the spaces between the particles in a dry packing.

2. The mixture according to claim 1, characterized in that the electrolytic medium is a liquid.

3. The mixture according to claim 1, characterized in that the electrolytic medium contains a gelling agent and is in solid form.

4. The mixture according to claim 1, characterized in that the particles comprise zinc, a zinc alloy, or a combination thereof.

5. The mixture according to claim 2, characterized in that the particles comprise zinc, a zinc alloy, or a combination thereof.

6. The mixture according to claim 3, characterized in that the particles comprise zinc, a zinc alloy, or a combination thereof.

7. The mixture according to claim 1, characterized in that the particles comprise zinc, a zinc alloy, or a combination thereof at an amount of less than 65% by weight of the mixture.

8. The mixture according to claim 1, characterized in that the particles comprise zinc, a zinc alloy, or a combination thereof at an amount of less than 62% by weight of the mixture.

9. The mixture according to claim 2, characterized in that the particles comprise zinc, a zinc alloy, or a combination thereof at an amount of less than 65% by weight of the mixture.

10. The mixture according to claim 2, characterized in that the particles comprise zinc, a zinc alloy, or a combination thereof at an amount of less than 62% by weight of the mixture.

11. The mixture according to claim 3, characterized in that the particles comprise zinc, a zinc alloy, or a combination thereof at an amount of less than 65% by weight of the mixture.

12. The mixture according to claim 3, characterized in that the particles comprise zinc, a zinc alloy, or a combination thereof at an amount of less than 62% by weight of the mixture.

13. A method of producing electric current in a battery by a mixture of metallic particles and an electrolytic medium, wherein the mixture is the mixture of claim 1.

14. A battery comprising a mixture of an electrolytic medium and metallic particles, wherein the mixture is the mixture according to claim 1.

15. A process for preparing a mixture of particles of a metal, metal alloy, or combination thereof comprising
    spraying or granulating liquid metal, metal alloy, or combination thereof into irregularly shaped having a non-uniform surface and a bulk density below 33% by weight of the specific density of the metal, metal alloy, or combination thereof,
    optionally separating out oversize particles, undersize particles, or oversize and undersize particles,
    introducing the particles into a liquid electrolyte having a volume larger than the void volume of the particles in a dry packing.

* * * * *